UNITED STATES PATENT OFFICE.

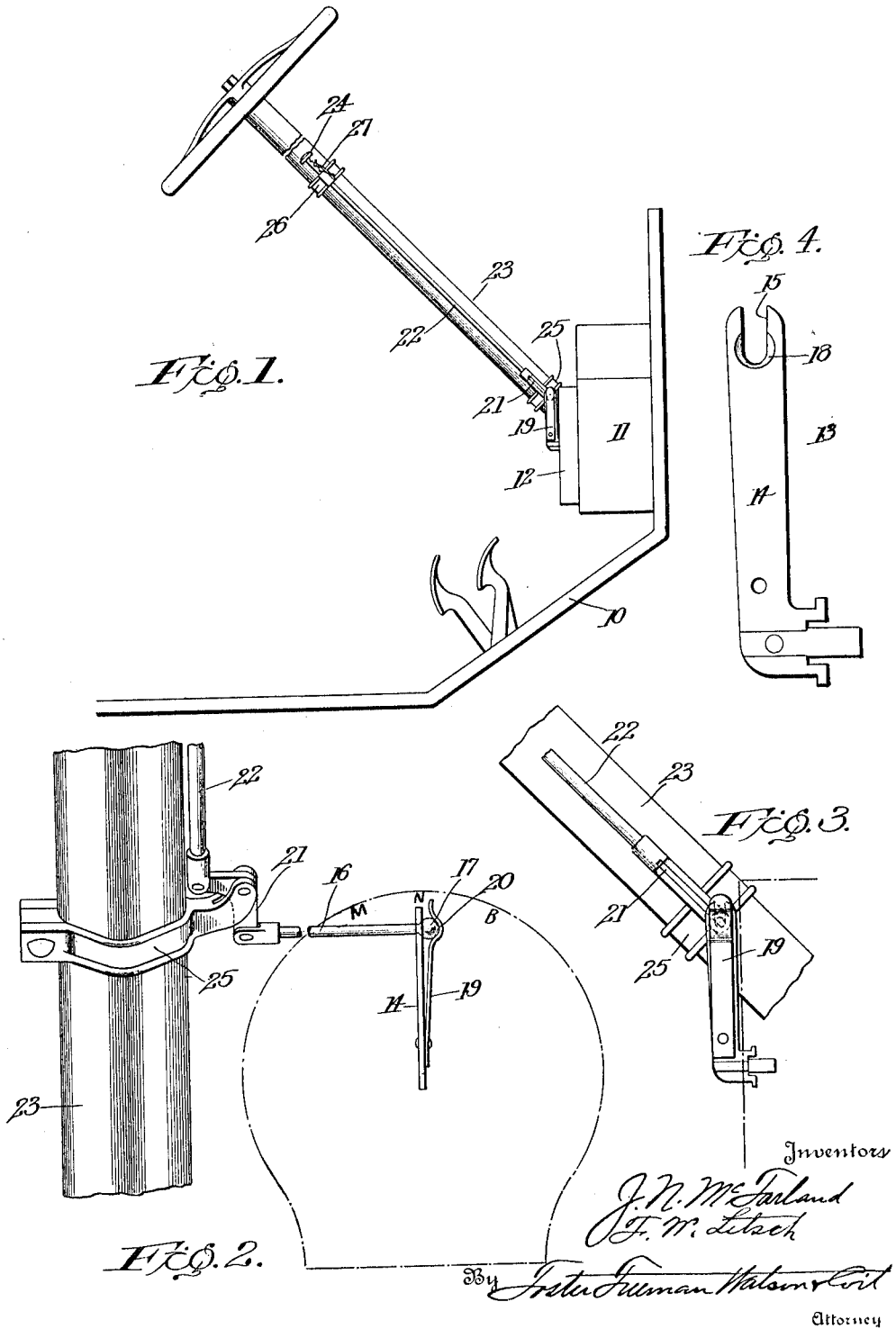

JOHN N. McFARLAND AND FREDERICK W. LETSCH, OF BALTIMORE, MARYLAND; SAID LETSCH ASSIGNOR TO SAID McFARLAND.

SWITCH-OPERATING DEVICE FOR MOTOR-VEHICLES.

1,273,514.   Specification of Letters Patent.   Patented July 23, 1918.

Application filed August 16, 1917. Serial No. 186,590.

*To all whom it may concern:*

Be it known that we, JOHN N. McFARLAND and FREDERICK W. LETSCH, citizens of the United States, residing in the city of Baltimore, State of Maryland, have invented certain new and useful Improvements in Switch-Operating Devices for Motor-Vehicles, of which the following is a specification.

This invention relates to switch operating devices for motor vehicles and has for its object to provide a device of this character which may be readily attached either to machines now in use or to machines in course of construction, and which enables the operator to manipulate the key controlling the switch box by taking his hand from the steering wheel for a moment only and without bending forward, and at the same time permitting the key to be removed and the machine locked at any time.

Our invention is illustrated as applied to a Ford automobile, to which it is peculiarly adapted, but it may be attached to other makes of automobiles as well. The following description, taken in connection with the accompanying drawings will reveal the novel features of the invention.

Referring to the drawings:

Figure 1 is a section through the dash of an automobile showing in side view one embodiment of the invention;

Fig. 2 is an enlarged view of portions of the same as seen from the rear;

Fig. 3 is an enlarged view of a portion of the apparatus shown in Fig. 1; and

Fig. 4 is an enlarged side view of the switch key.

The dash 10 of the automobile supports the coil box 11, upon which is mounted the switch box 12 which controls the ignition. The key 13, of peculiar shape must be inserted into its keyhole in the switch box before the engine can be started and the position of the key also determines whether the circuit through the sparking devices includes the battery or includes the magneto, thus in Fig. 2 of the drawings, the key may occupy one of three positions indicated by the letters M, N and B, the circuit through the magneto being indicated by M and the circuit through the battery by B, while the neutral position is indicated by the letter N.

The engine is usually started with the key turned so that the current from the battery is used to create the ignition spark and after the engine is running, the key is turned so that the magneto supplies this current.

The key is often turned when the automobile is in motion which of course requires that the operator take one hand from the steering wheel and also requires him to lean forward toward the dash. This is dangerous, as the relaxation of vigilance of the driver may cause a collision, and we avoid this danger by supplying a means which enables the operator to manipulate the switch key from a point adjacent the steering wheel and without altering the position of his body.

The switch key 13 is provided with a laterally projecting arm 14, and we provide a slot 15 in the free end of the arm adapted to receive a rod 16 having an enlarged portion or ball 17 on the end theerof. At the lower end of the slot 15 is a shallow socket 18 which receives the ball 17 and secured to the side of the key is a leaf spring 19, having a recess 20 at its free end which fits around the ball 17 and holds the same in the socket 18. The opposite end of the rod 16, which is disposed substantially at a right angle to the plane of the key, is pivotally connected to one end of a small bell crank lever 21. To the opposite end of the bell crank lever is pivoted the lower end of a rod 22, which extends upwardly along the steering column 23, and terminates in a handle portion 24. The bell crank lever 21 is pivoted to a bracket 25, secured to the steering column, and the upper end of the rod 22 passes through a guide integral with a collar 26 fastened to the steering column. The upper end of the rod 22 just below the handle 24 is provided with three notches and the leaf spring 27 is adapted to engage any one of these notches to hold the rod 22 in any of three positions, which correspond to the three positions of the switch key. The spring 27 is not strong enough to prevent the rod 22 being moved from notch to notch under pressure of the hand on the handle 24, and does prevent the rod from slipping.

From the foregoing description the operation of the device will be apparent. As the rod 22 is moved up and down by the hand, the bell crank lever transmits the motion to the rod 16 which actuates the key.

The rod 16 may be easily detached from the key by simply drawing it from the slots 15, and the key may then be removed and the machine rendered inoperative.

The invention requires but few parts in its embodiment and is cheap to manufacture and is also readily attachable to machines already in use.

Having thus described our invention, what we claim, is:

1. In an automobile, a switch box, a removable key therefor having a lateral projection provided with a slot therein, a member having a ball portion thereon, extending through said slot, a spring secured to said key and adapted to engage the ball portion of said member to hold the member within the slot, and means connected to said member and extending upwardly therefrom and adapted to be manually operated to actuate said member and turn the key.

2. In an automobile, a switch box, a removable key therefor, a member detachably secured to said key, by a suitable universal joint, a second member, a bell crank lever pivotally secured to each of said members, a support for said bell crank lever and said second member, the latter being adapted to be manually operated to actuate said bell crank lever and said first member to turn the key.

In testimony whereof we affix our signatures.

JOHN N. McFARLAND.
FREDERICK W. LETSCH.

Copies of this patent may be obtained for five cents each, by addressing the "Commissioner of Patents, Washington, D. C."